(12) United States Patent
Moser et al.

(10) Patent No.: US 10,401,792 B2
(45) Date of Patent: Sep. 3, 2019

(54) DIGITAL HOLOGRAPHIC DEVICE

(71) Applicant: Lyncée Tec SA, Lausanne (CH)

(72) Inventors: Christophe Moser, Lausanne (CH); Zahra Monemhaghdoust, Lausanne (CH); Frédéric Montfort, Lausanne (CH); Christian Depeursinge, Préverenges (CH); Yves Emery, Mont-sur-Lausanne (CH)

(73) Assignee: Lyncée Tec SA, Ecublens (CH)

( * ) Notice: Subject to any disclaimer, the term of this patent is extended or adjusted under 35 U.S.C. 154(b) by 214 days.

(21) Appl. No.: 15/115,297

(22) PCT Filed: Feb. 5, 2015

(86) PCT No.: PCT/IB2015/050874
§ 371 (c)(1),
(2) Date: Jul. 29, 2016

(87) PCT Pub. No.: WO2015/118475
PCT Pub. Date: Aug. 31, 2015

(65) Prior Publication Data
US 2017/0003650 A1    Jan. 5, 2017

Related U.S. Application Data

(60) Provisional application No. 61/936,380, filed on Feb. 6, 2014.

(51) Int. Cl.
*G02B 5/32* (2006.01)
*G03H 1/04* (2006.01)
*G03H 1/00* (2006.01)

(52) U.S. Cl.
CPC ............. *G03H 1/0443* (2013.01); *G02B 5/32* (2013.01); *G03H 1/0005* (2013.01);
(Continued)

(58) Field of Classification Search
CPC ............... G03H 1/0443; G03H 1/0005; G03H 2001/005; G03H 2001/0445;
(Continued)

(56) References Cited

U.S. PATENT DOCUMENTS 5,642,209 A * 6/1997 Baker ................... G02B 5/1885
359/10
7,355,768 B1 * 4/2008 Billmers ................ G02B 5/32
359/15

(Continued)

FOREIGN PATENT DOCUMENTS

EP         1119798 B1    9/2005

OTHER PUBLICATIONS

Cuche et al, "Digital holography for quantitative phase contrase imaging" Optics letters, vol. 24, n° 5, Mar. 1, 1999, pp. 291-293.
(Continued)

*Primary Examiner* — William R Alexander
*Assistant Examiner* — Balram T Parbadia
(74) *Attorney, Agent, or Firm* — Andre Roland S.A.; Nikolaus Schibli

(57) ABSTRACT

The techniques, apparatus, material and systems are described for a portable camera device which can be attached to the camera port of a conventional transmission or reflection microscope for complex wave front analysis. At least one holographic element (BS, grating) splits the beam (s) containing the sample information in two beams (r,o) and filters (r', o') them. The proposed invention has a relaxed alignment sensitivity to displacement of the beam coming from the microscope. Besides since it compensates the coherence plane tilt angle between reference and object arms, it allows for creating high-visibility interference over the entire field of view. The full-field off-axis holograms provide the whole sample information.

24 Claims, 8 Drawing Sheets

(52) U.S. Cl.
CPC ........... *G03H 1/041* (2013.01); *G03H 1/0465* (2013.01); *G03H 1/0493* (2013.01); *G03H 2001/005* (2013.01); *G03H 2001/0445* (2013.01); *G03H 2001/0452* (2013.01); *G03H 2001/0456* (2013.01); *G03H 2001/0473* (2013.01); *G03H 2222/24* (2013.01); *G03H 2223/23* (2013.01); *G03H 2223/26* (2013.01); *G03H 2227/02* (2013.01)

(58) Field of Classification Search
CPC .... G03H 2222/24; G03H 1/0493; G03H 1/08; G03H 1/0866; G03H 2001/0452; G02B 21/0056; G02B 21/0008; G02B 21/0016; G02B 5/32
See application file for complete search history.

(56) References Cited

U.S. PATENT DOCUMENTS

| | | | |
|---|---|---|---|
| 7,649,160 B2 | 1/2010 | Colomb et al. | |
| 2006/0109876 A1* | 5/2006 | Donoghue | G02B 5/32 372/32 |
| 2010/0027001 A1* | 2/2010 | Moser | G01J 3/02 356/301 |
| 2012/0116703 A1* | 5/2012 | Pavillon | G03H 1/0866 702/70 |
| 2013/0003073 A1 | 1/2013 | Yu et al. | |
| 2014/0193850 A1* | 7/2014 | Jooris | G06F 17/30525 435/29 |
| 2015/0049343 A1* | 2/2015 | Shaked | G01B 9/02057 356/503 |

OTHER PUBLICATIONS

Girshovitz, P., & Shaked, N. T. (2013). Compact and portable low-coherence interferometer with off-axis geometry for quantitative phase microscopy and nanoscopy. Optics express, 21(5), 5701-5714.

Ludman, J. E. Upton, T. D., & Coolidge, D. (May 2003). Single-element holographic nonspatial filter. In Electrogenic Imaging 2003 (pp. 375-379). International Society for Optics and Photonics.

Monemhaghdoust, Z., Depeursinge, C., & Moser, C. (Mar. 2014). Portable advanced off-axis camera for quantitative phase microscopy. In SPIE BIOS (pp. 894908-894908). International Society for Optics and Photonics.

Monemhaghdoust, Z., Montfort, F., Emery, Y., Depeursinge, C., & Moser, C. (2011). Dual wavelength full field imaging in low coherence digital holographic microscopy. Optics express, 19(24), 24005-24022.

Bhaduri, Basanta, et al. "Diffraction phase microscopy with white light." Optics Letters 37-6 (2012): 1094-1096.

Cuche, Etienne, Pierre Marquet, and Christian Depeursinge. "Simultaneous amplitude-contrast and quantitative phase-contrast microscopy by numerical reconstruction of Fresnel off-axis holograms," Applied optics 38.34 (1999): 6994-7001.

International Search Report of PCT/IB2015/050874 dated Jun. 8, 2015.

Ludman, Jacques E., et al. "Holographic nonspatial filter." SPIE's 1995 International Symposium on Optical Science, Engineering, and Instrumentation. International Society for Optics and Photonics, 1995.

Written Opinion of the International Seach Authority dated Jun. 8, 2015.

\* cited by examiner

| | |
|---|---|
| 1 | Image formation unit |
| 2 | Reference formation unit |
| 3 | Coherence management unit |
| 4 | Hologram formation unit |
| 5 | Processing unit |
| S | Sample |
| A | Amplitude data |
| P | Phase data |
| s | sample beam |
| o | object beam |
| o' | corrected object beam |
| r | reference beam |
| r' | corrected reference beam |
| h | hologram | thick grating 1    thick grating 2

1

DIGITAL HOLOGRAPHIC DEVICE

CROSS-REFERENCE TO RELATED APPLICATIONS

The present application is a United States national stage application of International patent application PCT/IB2015/050874 filed on Feb. 5, 2015 that designates the United States, and claims the benefit to priority of U.S. provisional application with the Ser. No. 61/936,380, filed Feb. 6, 2014, the entire contents of both documents are incorporated herein by reference in their entirety.

FIELD OF THE INVENTION

The present invention concerns a digital holographic device and more particularly a portable digital holographic device. The present invention relates to the field of digital holographic microscopic imaging, and more specifically this invention relates to a device or system for obtaining digital holograms. In particular, this invention concerns a device or system for obtaining digital holograms in a self-reference configuration, under short coherence illumination and in a single shot. The system or device can be connected to the camera port of any standard transmission or reflection microscope and obtain off-axis holograms of a sample providing phase and amplitude information.

BACKGROUND

The optical information retrieved by Digital Holography Microscopy (DHM) consists of the quantitative values of phase and amplitude of the wave front reflected or transmitted by a sample. The phase change can be interpreted in particular as 3D topography. Moreover, in cell imaging it has been demonstrated that Quantitative Phase Measurement (QPM) enables to monitor changes of morphology, of intracellular concentration, channel activity and many others underlying cellular processes. It is a growing research field.

DHM is a technique which grabs the optical information, reflected or transmitted by the sample, in the form of a unique hologram. For creating a hologram, it is mandatory to combine two beams.

Commonly, those two beams are (1) the object beam containing the sample information, and (2) a reference beam, which should be as close as possible to a perfect uniform beam (plane wave or Gaussian beam). The reference beam also needs to be spatially and temporally coherent with the object beam. Otherwise, they would not interfere and not build up a hologram. A coherent monochromatic source such as a laser is typically used and is split into an object beam and a reference beam where the object beam passes through a sample and is combined with the reference beam to create a hologram that is recorded.

However, existing digital holographic microscopes are cumbersome and voluminous. Such devices are difficult to displace between laboratories and also unsuitable for fieldwork. The lack of portability also makes such devices unsuitable for educational purposes.

The present invention provides a solution to the above problems.

It is therefore a goal of the present invention to provide a portable holographic device or system which is mountable on any standard microscope and which is able to generate the same quantitative phase information as that of DHM, with reduced artifacts compared to known holographic devices.

SUMMARY OF THE INVENTION

The present invention concerns a hologram generating device according to claim 1 as well as a method for generating a hologram according to claim 23. Other advantageous features can be found in the dependent claims.

The device according to the present invention can be attached to the camera port of a conventional reflection or transmission microscope for complex wave front analysis. An optical element splits a beam containing the sample information in two beams and a holographic element filters them. The present invention advantageously has a relaxed alignment sensitivity to displacement of the beam coming, for example, from the microscope. It matches the coherence plane tilt angle between reference and object arms to create high-visibility interference over the entire field of view. The full-field off-axis holograms that are produced advantageously provide the whole sample information.

This invention provides a portable device or system which can be retro-fitted into the existing port of standard microscopes, producing an amplitude and quantitative phase image from the video output of any transmission or reflection microscope with a resolution level comparable to that of current digital holographic microscopes and without the need for user intervention on the microscope hardware.

In the hologram generating device according to the present invention, instead of having separate reference and object beams (by splitting the beam before a sample), the reference beam is generated using only a sample beam by carrying out low-pass filtering on the sample beam frequency spectrum. A major advantage of this configuration is that it can be placed after the image plane of a regular microscope and extract the phase and amplitude information of the sample.

Moreover, the hologram generating device according to the present invention is preferably configured in an off-axis configuration and is a single shot technique (a single camera acquisition shot obtains or captures the hologram): it does not necessitate a vertical or a lateral scanning. The device of the present invention opens investigation to any dynamical process.

In order to exploit the whole field of view of the camera in an off-axis geometry, the coherence planes of the beams should be parallel. In the hologram generating device according to the present invention, coherence plane manipulation is carried out on the reference beam to permit full field imaging in an off-axis geometry.

The coherence plane of the reference beam is altered such that an off-axis digital hologram can be formed even with a low coherence source.

The hologram generating device according to the present invention advantageously employs a filtering approach which is applied directly in the Fourier domain (i.e. on the beam propagation angle). The invention provides a device and method that produces a reference beam from a sample beam that is insensitive to the sample or sample holder under investigation.

The invention provides an apparatus or device for generating a hologram from a sample beam emanating from an image forming device. The apparatus comprises: a beam generation unit arranged to split the sample beam into an object beam and a reference beam, the object beam being a none or partially filtered first portion of the sample beam and the reference beam being a partially or completely filtered second portion of the sample beam, a coherence management unit arranged to tilt a coherence plane of at least one of the object beam and the reference beam, a hologram creation unit that combines the object beam and the reference beam to create the hologram by interference between the reference beam and the object beam, and an acquisition and processing unit arranged to capture the hologram and process the hologram to extract an intensity image and/or a phase image.

Preferably, the hologram is an off-axis hologram.

Advantageously, the beam generation unit comprises at least one thick holographic grating for filtering high spatial frequencies in the sample beam in order to generate the reference beam.

Advantageously, the thick grating is arranged such it is crossed successively two times by the sample beam before obtaining the reference beam, whereby the second time of the two times the crossing is after a beam rotation of the sample beam or a reflection of the sample beam in order to achieve a 2 dimensional (2D) filtering of spatial frequencies in the sample beam for generating the reference beam.

Advantageously, the beam generation unit comprises at least two thick holographic gratings with orthogonal grating vectors to achieve a two dimensional (2D) filtering of spatial frequencies by diffraction of the sample beam, for the purpose of generating the reference beam.

Advantageously, the beam generation unit comprises at least one thick and two thin holographic gratings, the thin gratings managing the angular dispersion whereas the thick grating, having the same dispersion as the thin grating, filters the spatial frequencies in the sample beam in order to generate the reference beam under polychromatic light.

Advantageously, the beam generation unit further comprises at least a multiplexed (thick and/or thin) holographic grating to filter simultaneously different components of the sample beam (for example differentiated by wavelength) or split the beam in several sub beams.

Advantageously, the apparatus furthermore comprises a splitter arranged to separate the sample beam incident on the splitter into two parts, before the filtering of the sample beam by use of at least one thick grating to generate the reference beam.

Advantageously, the coherence management unit comprises at least one thin holographic grating that is arranged to tilt the coherence plane of at least one of the object beam or the reference beam.

Advantageously, the coherence management unit furthermore comprises a least one device configured to modify an optical path length of at least one of the object beam and the reference beam in order to ensure proper conditions of temporal coherence for the interference producing the hologram.

Advantageously, the optical path length is modified by translation of at least one of the following list: a mirror, a plurality of mirrors, a right angle prism, several right angle prisms.

Advantageously, the coherence management unit furthermore comprises a least one device configured to rotate or reflect at least one of the object beam or the reference beam in order to ensure proper conditions of spatial coherence for the interference producing the hologram.

Advantageously, the beam generation unit and the coherence management unit share at least one thin grating in common, the thin grating being arranged to have a function of dispersion compensation of the thick grating and a further function of tilting the coherence plane of the reference beam.

Advantageously, the hologram creation unit combines the object beam and the reference beam by use a thin grating.

Advantageously, the hologram creation unit combines the object beam and the reference beam by use a splitter.

Advantageously, the coherence management unit, and the hologram generation unit share at least one thin grating in common, the thin grating being arranged to have a function of combining the object beam and the reference beam, a further function of tilting the coherence plane of the reference beam and/or the object beam.

According to another aspect of the present invention, the image forming device is comprised in the apparatus and the image forming device is an optical microscope.

Advantageously, lenses to magnify, to demagnify or to relay the image of the sample provided by the imaging system are included in the device.

The optical microscope comprises a light emitting diode (LED) as a light source, with a possibly filtered emission spectrum in order to manage the temporal coherence.

Advantageously, the acquisition and processing unit comprises a video camera configured to capture the hologram and a computer configured to reconstruct numerically the hologram for extracting intensity and phase images according to methods of digital holography.

DESCRIPTION OF THE DRAWINGS

The above object, features and other advantages of the present invention will be best understood from the following detailed description in conjunction with the accompanying drawings, in which.

DETAILED DESCRIPTION

Figure 1:
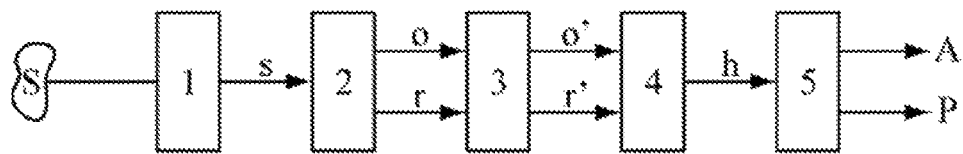
FIG. 1 describes and shows the principle schematics of the holographic device or system of the present invention.

The invention provides a portable device or system which can be retro-fitted onto the existing port of standard microscopes, producing an amplitude and quantitative phase image from the video output of any transmission or reflection microscope with a resolution level comparable to that of current digital holographic microscopes and without user intervention on the microscope hardware.

A sample (or object) is illuminated to generate a beam containing the sample information. The sample beam is then collected by, for example, a microscope objective. A beam splitter, for example, splits the sample beam in two arms. A reference beam is generated in one arm by low-pass filtering the sample beam frequency spectrum, totally or partially, with a thick holographic filter. One or two-dimensional filtering can be carried out.

The coherence plane of the reference beam is then altered by an optical component to match the coherence plane of the object beam of the other arm, which is non-filtered or also has been partially filtered in the same manner as that of the reference arm filtering. Such a component operating on the coherence plane can be, but is not limited to, a holographic grating. Both reference and object beams are then recombined to finally interfere on a digital camera.

Two-dimensional filtering is achieved using at least one thick holographic element. This holographic element can introduce a large coherence plane tilt into the reference beam in both directions (the diffraction angle can be tens of degrees). This means that the coherence plane of the reference beam makes an inconvenient angle with the coherence plane of the object beam and requires an out of plane propagation of the object beam to achieve the full field interference of the beams on the camera. The optical component to match the coherence planes of the beams, which can be a holographic element, is designed to compensate for this large coherence plane tilt on the reference beam and introduce a controlled small tilt in the coherence plane so that the object and reference beam interfere over the whole camera field of view in an off-axis configuration.

Two conditions have to be satisfied to have interference using short coherence length light sources such as those found in standard microscopes: (I) equal optical path in both arms of the interferometer, (II) spatial coherence.

To satisfy the first condition, a delay is introduced, for example but not limited to, by a prism or mirrors in the object beam arm, or in the reference beam arm, mounted on a linear translation stage.

For the second condition to be satisfied, the orientation of the reference and object beams are to be identical, meaning that the corresponding regions of the reference and object beams interfere with each other to produce a hologram rich in amplitude and phase information.

Thus, if a rotation system has been introduced in the path of the reference arm, for example to perform 2D filtering, an equivalent beam rotation system has to be introduced in the path of the object beam.

FIG. 1 schematically illustrates the portable device or system of the present invention. The portable device or system of the present invention includes, for example, five units 1, 2, 3, 4, 5, as shown in FIG. 1. The aim of the system is to capture and provide amplitude and phase information related to the sample (or object) S.

Unit 1 is forming an image of the sample. Its output is a sample beam s. Unit 2 is creating an object beam, containing, partially or completely, the complex information (amplitude and phase) of the object, as well as a reference beam that has been, partially or completely, cleaned of spatial frequency information contained in the sample beam. Unit 3 is managing the coherence planes of the reference and object beams in order to have coplanar coherence planes for a proper or optimized interference in the hologram formation unit (unit 4). Unit 4 records a hologram that is transmitted to and processed by the processing unit (unit 5) to extract the amplitude and phase information on the sample.

Unit 1: Image Forming Unit

The image forming unit is capable of creating an image out of a sample. That is, electromagnetic radiation coming from an object or sample S is collected to produce a sample beam. Unit 1 provides a sample beam containing the complex field (amplitude and phase) originating from the sample, for example by use of optical elements, such as lenses, mirrors or prisms.

The image formation unit may comprise its own light source for illuminating the sample in order to generate a sample beam. This light source can be, for example, a laser, an LED or a white-light source. The sample beam can also be generated by use of ambient or external light, or by use of light emitted by the sample itself.

The sample is illuminated so that a sample beam can be generated by unit 1 from light containing sample information that emanates from the object or sample S.

Unit 1 can also be a non-optical imaging system such as x-ray systems, electronic microscopes.

Preferably, the image forming unit 1 is an optical reflection or transmission microscope. Unit 1 alternatively includes a microscope objective MO and/or a collimation lens L1 (see for example FIG. 10). Additional lenses can be used to magnify, demagnify or relay the image of the sample generated by the image forming unit further into the device. These lenses can be located between the image forming unit (unit 1) and the beam generation unit (unit 2), or for increased compactness of the system, mixed in the different units (see for example lenses L2 to L4 in FIG. 11 that demagnify the beam and lenses L5 to L7 that relay the image to the camera).

In the case where the image forming unit is an optical reflection or transmission microscope, the device or system according to the present invention may include the optical reflection or transmission microscope, or alternatively may not include the optical reflection or transmission microscope.

The device or system according to the present invention functions when an optical beam (preferably collimated) containing the sample information is provided to the beam generation unit 2.

Unit 2: Beam Generation (or Reference Formation) Unit

The second unit 2 is creating a reference beam r and an object beam o out of the sample beam s.

The object beam contains, partially or completely, the amplitude and phase information related to the sample.

The object beam includes (partially or completely) the amplitude and phase information imprinted on the electromagnetic radiation by the sample S following interaction of the electromagnetic radiation with the sample S.

The reference beam is a, partially or completely, cleaned beam.

Preferably, the object beam contains the same spatial spectrum as that of the sample beam, and the reference beam should be as close as possible to a perfect uniform beam (plane wave or Gaussian beam).

Figure 6:
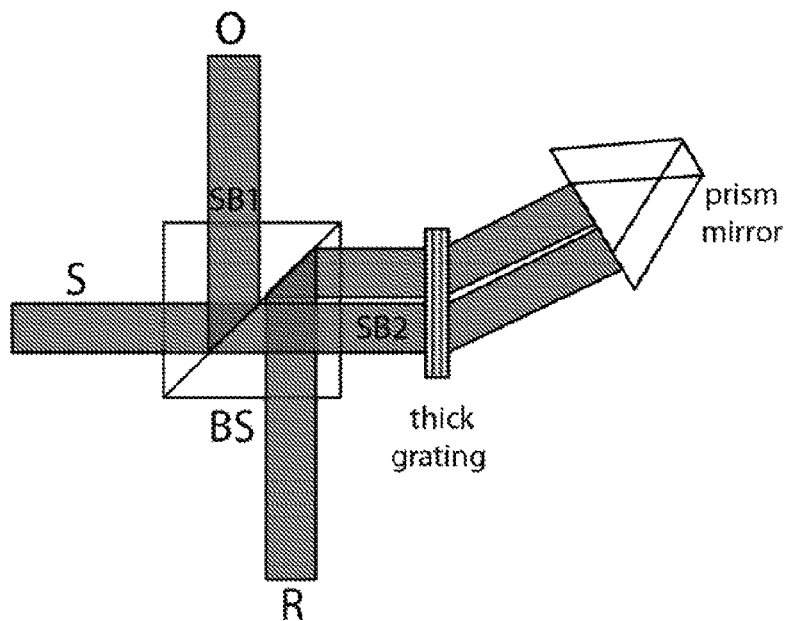
FIG. 6 illustrates a preferred embodiment for the formation of the reference beam in two steps
Figure 7:
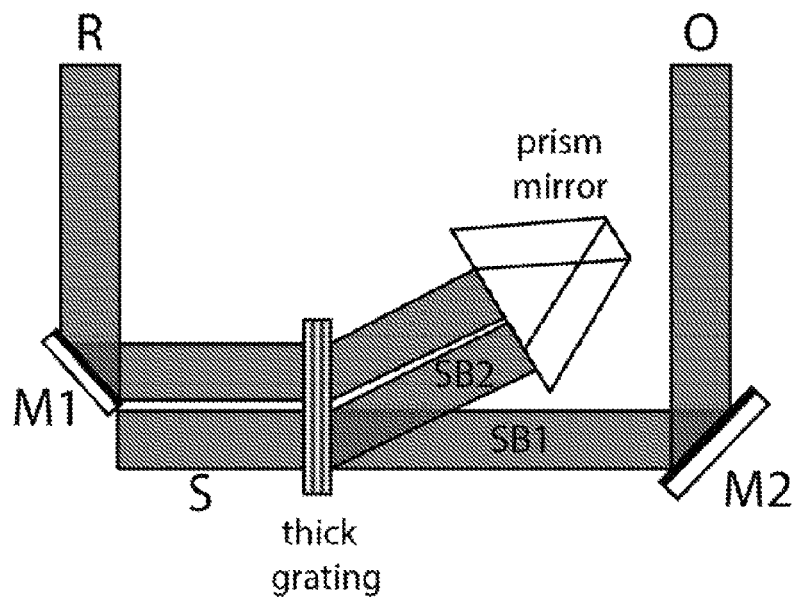
FIG. 7 shows the principle of forming a reference beam in a single step using a single thick holographic grating.

The generation of the reference and object beams by unit 2 contains or is made up of two parts that can be done sequentially (see for example FIG. 6) or simultaneously (see for example FIG. 7).

The first part is to split the sample beam in two beams. The second is to clean the desired information contained in the resulted beams, that is, spatial frequencies of the beams are filtered, to create the reference and object beams. Alternatively, the sample beam is split into two beams as a first step and then one or both of the split beams are cleaned (spatial frequencies of one or both beams are filtered) to create the reference beam and the object beam. The sample beam can be split in two using any element that creates two beams out of one, such as a beam splitter, diffractive elements, fiber couplers, evanescent wave couplers . . . .

The reference and object beams can be cleaned by filtering in K(wavevector)-space (Ewald sphere) (see for example FIG. 2 that illustrates the principle of a thick holographic grating) with the advantage to ensure independency on the x-y position and avoiding the necessity of focusing, contrary to Fourier plane filtering as realized for example by pinhole spatial filtering.

Figure 2:
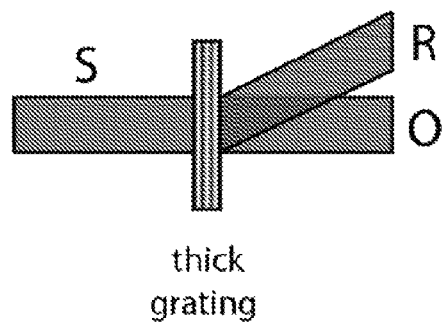
FIG. 2 shows a thick holographic grating for to carrying out holographic spatial filtering which is done directly on the beam propagation angle permitting alignment sensitivity to relax.

FIG. 2 shows holographic spatial filtering according to the present invention using a thick holographic grating (holographic filtering element) which is done directly on the beam propagation angle of the sample beam. Advantageously, this allows alignment sensitivity of the device components to displacements of the beam to be relaxed.

This K-space filtering can be performed using diffractive elements, such as diffractive gratings, or thick holographic gratings. The term thick holographic grating means thick volume holographic grating or thick volume diffracting optical element (VDOE) where the grating is present throughout the volume (bulk) of the material containing the grating.

The thick holographic grating (or holographic filtering element) includes one or more gratings that operate as filtering elements to filter the sample beam or the split beams of the sample beam. For example, photo-thermo-refractive (PTR) glass is used to register a thick grating therein. The recording of the grating in the glass material is performed by illuminating the glass material under an interference pattern. The illumination will create a refracting index modulation in the material according to the interference pattern intensity. The interference pattern is created using two interfering beams having each one a defined incidence angle on the recording material. The pattern to be imprinted in the glass is calculated according to coupled-wave theory (H. Kogelnik (1969). "Coupled-wave theory for thick hologram gratings". *Bell System Technical Journal* 48: 2909. The parameters are optimized for one wavelength to minimize the angular selectivity and maximize the diffraction efficiency. For simplicity and symmetric design, the thick grating is designed without slant angle. Dispersion of the calculated element defines the incidence and out coming angles for the other wavelengths. The exposed glass is then thermal treated to stabilize the grating.

Figure 4:
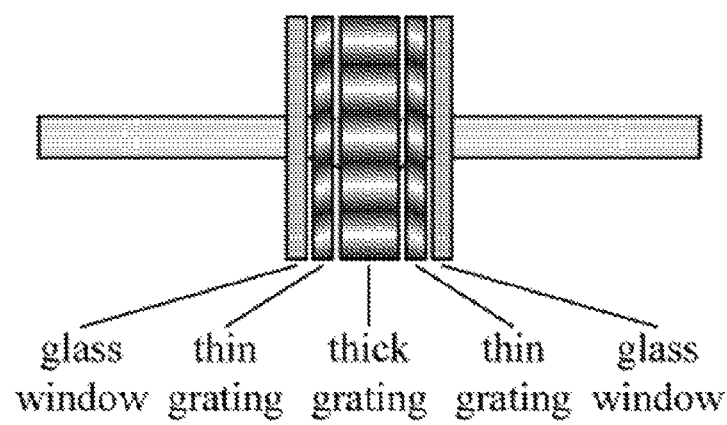
FIG. 4 shows a compact version of the polychromatic 1D filtering with temporal coherence chirp correction (a compact polychromatic 1D filtering element with dispersion compensation).

In the case of the filtering element composed of two additional thin gratings, as depicted in FIG. 4, the thin gratings are identical due to the fact that the thick grating has no slant angle. The constraint of having the incident angle being perpendicular to the grating surface and the dispersion given by the thick grating determines the grating vector and the slant angle of the thin gratings.

Figure 5:
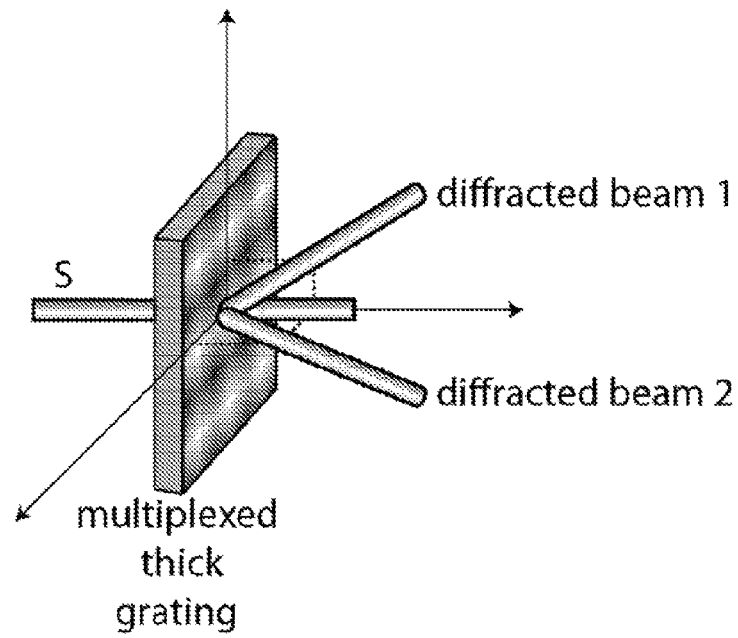
FIG. 5 shows the principle of the multiplexed holographic filtering using a multiplexed thick holographic grating.
Figure 12:
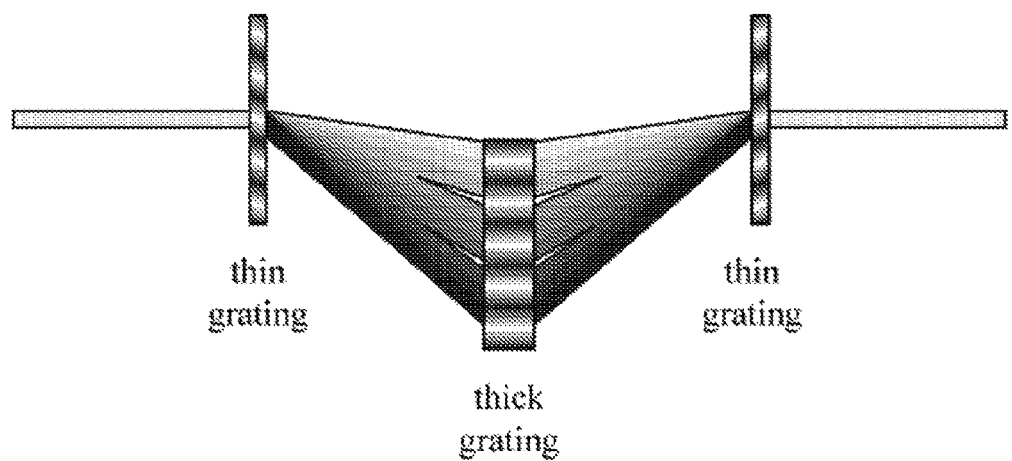
FIG. 12 shows an example of multiplexed polychromatic 1D filtering for RGB light.

In case of a multiplexed grating (such as shown in FIG. 5 and FIG. 12), the calculations are performed independently and recording is performed sequentially for each grating. Optimization of the illumination time has to be performed in order to have equally efficient diffraction for both gratings.

In case of a multiplexed filtering element (such as shown in FIG. 12), the calculations are performed independently for each of the multiplexed assembly (each thin/thick/thin grating assembly is independent from the other and calculated independently). The orientation of the diffraction angles can be chosen arbitrarily for each assembly.

The thick holographic grating (or holographic filtering element) carries out beam cleaning or filtering to remove or attenuate higher intensity spatial frequencies present in a Fourier transform frequency spectrum (see FIG. 8(b). These higher intensity spatial frequencies present in a Fourier transform frequency spectrum are due to the interaction of the beam with the sample, to aberrations or excess or arbitrary spatial variations in the optical system.

The thick holographic grating (or holographic filtering element) carries out beam cleaning or filtering by acting on the beam propagation angle and more specifically the propagation angle of the electromagnetic radiation making up the beam.

The thick holographic grating (or holographic filtering element) includes a recorded hologram or grating that selectively diffracts or deflects electromagnetic radiation in the beam that falls within a defined frequency or wavelength range and that is incident on the grating at a predetermined or specified angle (or angular range). The reference and/or object beam (that are later made to interfere at the camera of the device) is made up of this selected (diffracted) portion.

The remainder of the incident sample beam falling outside the defined wavelength range and angle is transmitted through the thick holographic grating (or holographic filtering element) without being diffracted or deflected and is thus removed.

The angular selectivity of the recorded grating removes the part of the beam having excess or arbitrary spatial variations. The resulting reference beam and/or object beam is thus cleaned of the higher spatial frequencies (both low and high frequencies) as illustrated in FIG. 8(d).

The resulting filtered or clean beam is made up of a more uniform spatial distribution. The filtering is carried out to produce a smooth transverse beam profile, which should be as close as possible to a uniform beam (plane wave or Gaussian beam), similar to the beam hitting the sample. All information induced by the sample is removed.

Figure 8:
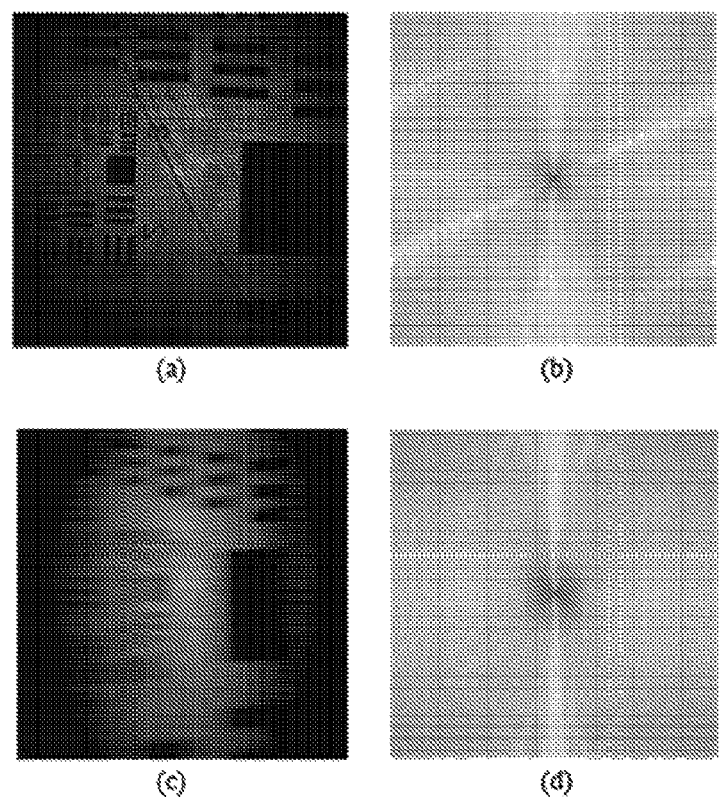
FIG. 8 shows the results of 1 dimension filtering using a thick volume holographic grating.

The result of the one dimensional filtering using a thick volume holographic grating is presented in FIG. 8. FIG. 8(a) is the unfiltered intensity image and 8(b) the Fourier transform of the image of FIG. 8(a) showing its spatial frequencies (frequency spectrum showing intensity of low frequency to high frequency information in image of FIG. 8(a) where the center of FIG. 8(b) contains the low frequency information). FIG. 8(c) is the 1 dimension filtered image and (d) its spatial frequencies. Only spatial frequencies along one direction remain. All the others have been filtered out. In the direct image, it results in un-sharp edges in one direction, as a result of the missing frequencies. The other direction remains sharp.

FIG. 6 illustrates the formation of the reference beam in two steps. Splitting and filtering of the sample beam are carried out sequentially. A clean (filtered) reference beam is formed in two steps using a thick holographic grating and a beam splitter cube BS. A beam splitter BS divides the sample beam into two beams. One of the split beams SB1 remains unchanged (unfiltered) and is the object beam o. A thick holographic grating filters the other split beam SB2 in one direction (a first arbitrary direction). The resulting beam is then reflected by a prism mirror set at 45° angle which inverts the x and y axes of the split beam SB2, so that when it passes back through the same thick holographic grating, the second direction (orthogonal to the first one, as the x and y axes have been inverted by the prism mirror) is filtered by the same thick holographic grating. The out-coming beam is filtered in both directions (2D filtering) and results in the reference beam R (FIG. 6).

Figure 14:
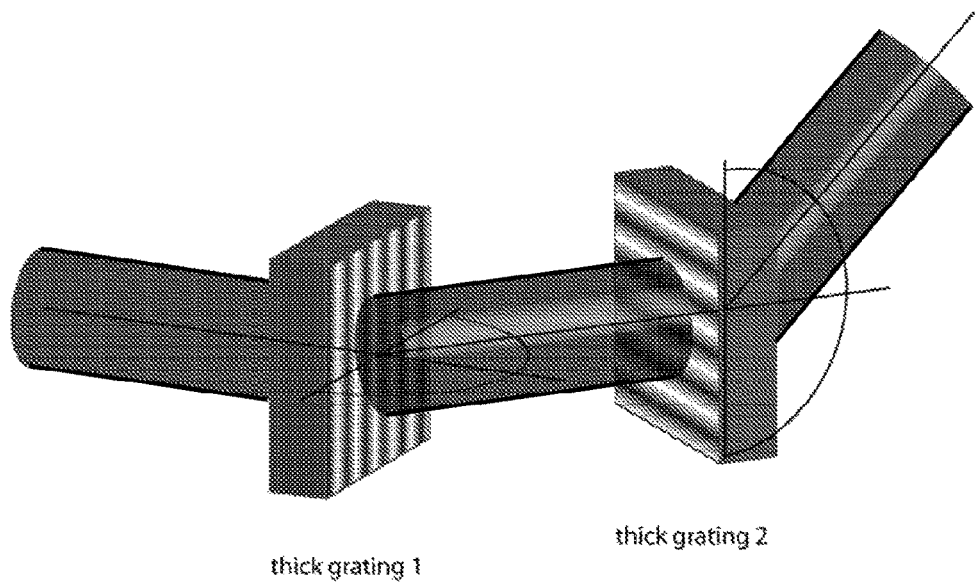
FIG. 14 illustrates a 2D filtering principle for a monochromatic beam using two thick gratings having orthogonally disposed grating vectors.

FIG. 14 illustrates the filtering with 2 orthogonally disposed thick gratings. The first thick grating filters the beam in the direction of the first grating vector (set in a chosen arbitrary direction). The diffracted beam reaches then a second thick grating disposed such that its grating vector is orthogonal to the first grating vector. The beam is diffracted again and filtered in the second direction. Being filtered in two orthogonal directions, the beam has been 2D filtered and results in the reference beam R.

Generating two filtered beams out of a sample beam can alternatively be performed by unit 2 using a thick multiplexed holographic grating as illustrated in FIG. 5. Splitting and filtering of the sample beam are performed simultaneously. In this case, two gratings are recorded in the material (for example, in the glass material previously mentioned) and each grating performs independently of the other (FIG. 5). The two or more multiplexed gratings can be recorded with their grating vectors parallel to each other, perpendicular to each other, or with any angle between them.

FIG. 5 shows multiplexed holographic filtering using a multiplexed thick holographic grating. The incident sample beam is divided into three beams. Each of the two diffracted beams has its spatial frequencies in its diffraction plane filtered out. In the illustrated case, the multiplexed holographic gratings are orthogonal. This means that the spatial frequencies remaining in one diffracted beam are orthogonal to the ones remaining in the other diffracted beam. The third transmitted beam illustrated in FIG. 5 is not diffracted. The thick multiplexed holographic grating simultaneously (i) splits the sample beam and (ii) filters.

The reference and object beams can also be created in a single step if directly extracted out of the sample beam, as with one (FIG. 7) or more thick holographic gratings for example. FIG. 7 shows the formation of a reference beam in a single step using a single thick holographic grating. The sample beam S passes through a thick holographic grating (thick grating) that generates two beams. The split beam SB1 that passes straight through (onto illustrated mirror M2) has unmodified spatial frequencies and is the object beam O. The diffracted beam is filtered in one direction by the thick grating. It is reflected by a prism mirror set at 45° angle which inverts the x and y axes of the beam. When passing back through the thick holographic grating, it is filtered in the second direction. The resulting beam is a clean or filtered reference beam R.

In a preferred embodiment of the present invention (see setup FIG. 10), the sample beam is split in two beams using a beam splitter cube (as used for example in FIG. 6). One beam becomes the object beam O. The other beam is filtered using a thick holographic grating that low pass filters the beam in one direction. After a first passage through the thick holographic grating, the beam is reflected in an appropriate way to invert the x and y axes when returned and is filtered in the second direction when passing back through the same thick holographic grating.

Figure 10:
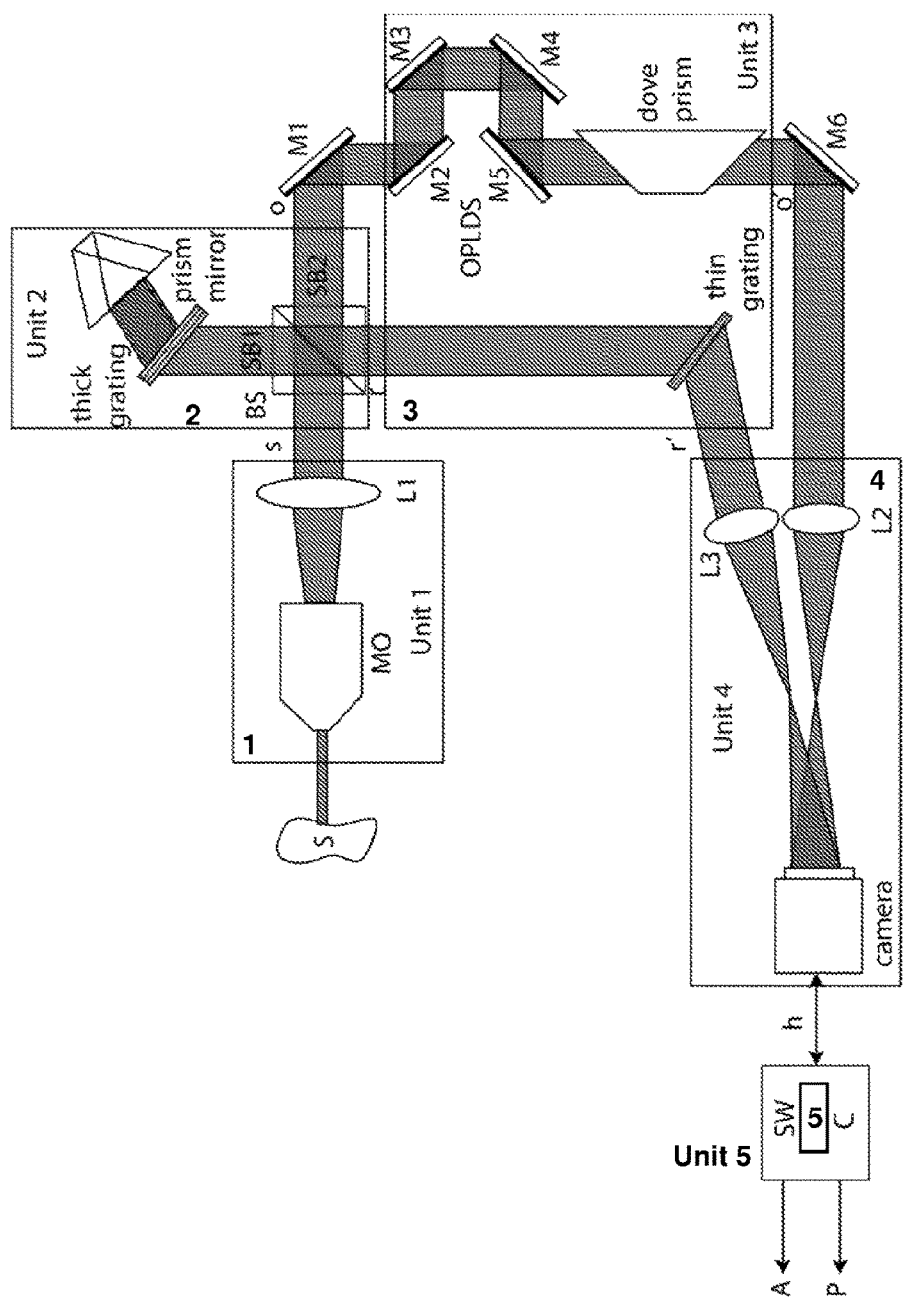
FIG. 10 depicts a first exemplary holographic system according the present invention, relating to a narrow bandwidth setup.

FIG. 10 depicts a holographic device or system according the present invention and relates to a narrow bandwidth setup. The system includes units 1, 2, 3, 4 and 5.

The imaging unit (unit 1) comprises a microscope objective MO and a collimation lens L1. This unit generates the sample beam s.

The beam generation unit (unit 2) comprises a beam splitter cube BS that divides the sample beam into two beams. One beam is the split beam SB1 that is diffracted by the thick holographic grating (thick grating). This filters the beam in one direction and tilts the coherence plane by an angle equal to the diffraction angle. The beam is then reflected by a prism mirror inclined at 45°. This configuration inverts the x and y direction of the beam. When this beam passes back through the thick holographic grating it is filtered in the second direction and introduces another coherence plane tilt in the perpendicular direction of the first one. The resulting beam is a clean or filtered reference beam with a large coherence plane tilt.

The coherence plane can be defined as being the geometrical locus of points in a wave front that have the same phase. In our setup, the coherence plane is perpendicular to the propagation direction if it has not crossed a grating.

The thick holographic element introduces a large coherence plane tilt in the reference beam in both directions. This means that the coherence planes of the two beams after the complete filtering system make an inconvenient angle between them. The coherence planes have thus to be managed by unit 3.

Figure 9:
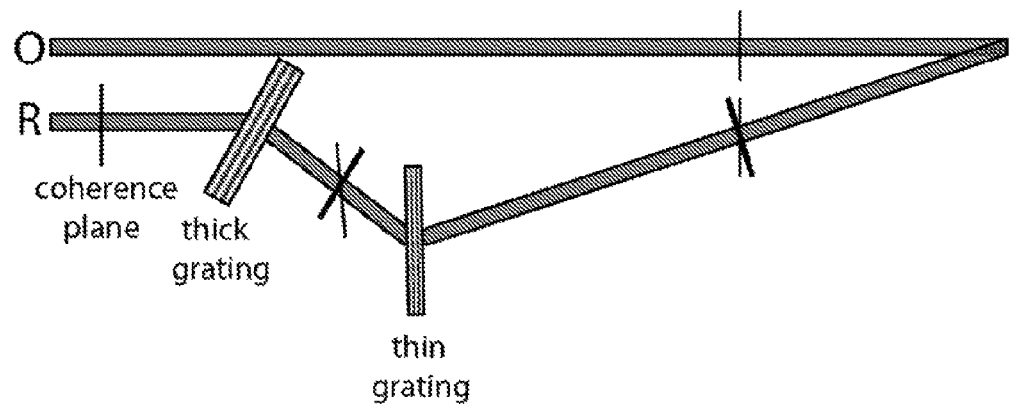
FIG. 9 illustrates a coherence management principle according to the present invention.

FIG. 9 illustrates a coherence management principle according to the present invention. In the reference arm R, the thick holographic grating (thick grating) introduces a large tilt of the coherence plane. The thin holographic grating (thin grating) corrects the coherence plane tilt angle to match the coherence plane of the object beam (O).

As illustrated in FIG. 10, the resulting coherence plane tilt of the reference beam r is then adjusted by a thin holographic grating (thin grating) so that corrected reference beam r' is coplanar to the coherence plane tilt of the object beam o'.

The second beam outgoing from the beam splitter cube BS is the object beam o (or split beam SB2). It is deflected by a mirror M1 into the optical path length delay system OPLDS, comprising four mirrors M2 to M5. The delay system adjusts the object beam path length to that of the reference beam by translating (or displacing) mirror M3 and mirror M4.

A dove prism is then used to reflect the object beam in an equivalent way to that of the prism mirror acting on the reference beam r. The resulting corrected object beam o' ensures the spatial coherence of the two corrected beams r' and o'.

Mirror M6 is then reflecting the object beam o' into a hologram formation unit (unit 4). Two (tube) lenses L2 and L3 image the corrected beams near or at the camera recording plane. The two corrected beams finally interfere on the camera in an off-axis configuration to form the hologram h.

The camera then transmits the acquired hologram h to a processing unit (unit 5) composed of a computer or processor C and software SW that retrieves the amplitude and phase information of the hologram h.

The thick holographic grating of unit 2 can be made of a, but not limited to, glass, polymer and crystal material. The high angularly selective Bragg effect operating in transmission effectively spatially filters the sample beam by diffraction. Because of the dependence of diffraction wavelength with angle (ref. Joseph Goodman "Introduction to Fourier Optics", Mc Graw Hill), the spatially filtered beam has a spectral bandwidth dictated by the thick holographic element (typically below one nanometer). A change of incidence angle of the polychromatic sample beam (which can be, but not limited to several tens to hundreds of nanometers), which may occur because of the sample itself or the sample holder (microscope slide but not limited to) generates a spatially filtered beam with a spectrally shifted spectrum. Unlike a pinhole filtering method (at the Fourier plane of a lens), which is very sensitive to angular deviation, the described embodiments of unit 2 of the present invention provides a beam which is not altered spatially in such a case.

Figure 3:
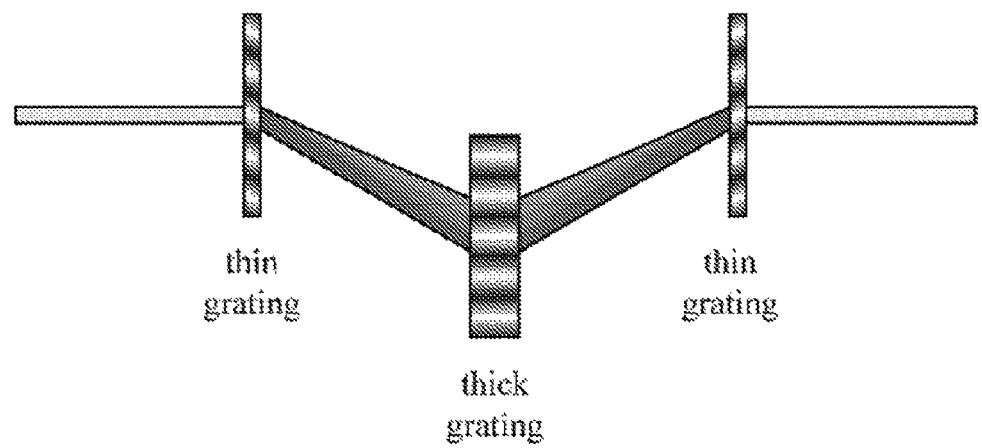
FIG. 3 shows the principle of the polychromatic 1D filtering.

In another embodiment of unit 2, the spatial frequency filtering is performed using a combination of thin and thick gratings, as shown for example in FIG. 3 (FIG. 3 shows polychromatic 1D filtering), with two thin gratings and one thick grating. The thin gratings are used as dispersive and coherence management elements.

A first thin grating disperses the beam to match the angular dispersion required by the thick grating to diffract efficiently at all wavelengths. A second thin grating compensates the angular dispersion resulting from the thick grating in order to align all k-vectors again.

An appropriate design enables to low pass filter a polychromatic beam in one direction. It also permits to filter without changing neither the coherence plane angle nor the angular dispersion and minimizes the temporal coherence chirp induced by dispersion. Appropriate elements, such as glass windows for example, can be added as part of the coherence management unit to equalize the optical path length in both arms of the interferometer for each wavelength by compensating for the chirp. The thin gratings are designed in a way that they are parallel to the thick grating allowing them to be laminated on the thick grating surface to form a block.

Dispersion compensation windows can be added on one or both sides of the block to build a compact element. Their material and thicknesses may be different. FIG. 4 shows a compact version of the polychromatic 1D filtering with temporal coherence chirp correction (a compact polychromatic 1D filtering element with dispersion compensation). The two thin gratings are laminated on each side of the thick one. Two windows, not necessary made of the same glass and thickness, are sealed on each side of the block.

Figure 15:
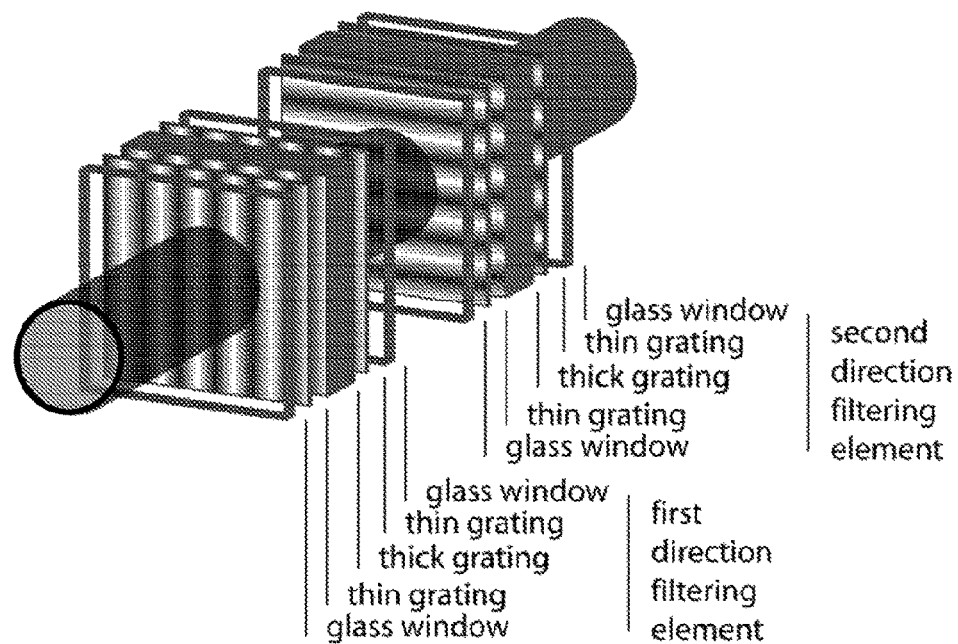
FIG. 15 illustrates a 2D filtering principle for a polychromatic beam using two orthogonally disposed filtering elements (shown in FIG. 4).

FIG. 15 illustrates a 2D filtering with two such filtering elements of FIG. 4. The two elements are disposed in order that the grating vectors of the two thick gratings are orthogonal. This arrangement allows 2D filtering of a polychromatic beam. After the first element, the beam is filtered in the first direction (direction of the first thick grating vector set arbitrarily). The outgoing beam direction is identical to the incoming beam one. After the second grating, the beam is filtered in the second direction (direction of the second thick grating wave vector, set orthogonally to the first thick grating wave vector). The outgoing beam is 2D filtered and has still the same direction than the incoming one. The filtering assembly is very compact as all elements can be joined to form a block. The glass windows can be rearranged in the design, by being displaced, and/or combined, to compact furthermore the 2D filtering assembly.

In another embodiment of the present invention, (shown in FIG. 12 illustrating a multiplexed filtering element), the sample beam S is split into three beams using two thin and one thick multiplexed holographic gratings. The multiplexing of the gratings enables to extend the bandwidth of the polychromatic beam as if three different filtering elements illustrated in FIG. 4 were superimposed.

Figure 11:
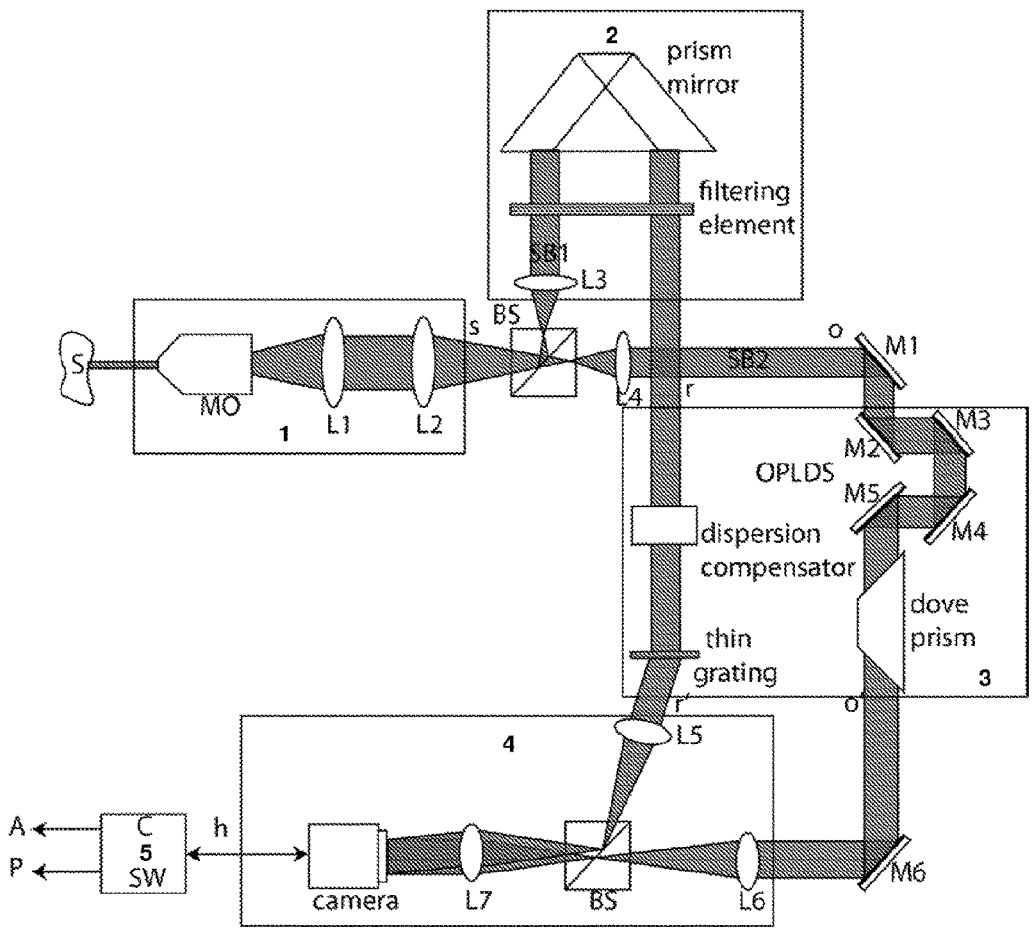
FIG. 11 depicts a second exemplary holographic system according the present invention, relating for example, to a broad bandwidth setup with demagnifying lenses included around the separation beam splitter.

FIG. 11 depicts another embodiment of a holographic device or system according the present invention, relating to a broad bandwidth setup.

The principle is similar to the setup of FIG. 10, but with the difference that it may work with a broadband source.

In addition to setup illustrated in FIG. 10, the sample beam in the embodiment of FIG. 11 is first demagnified using lenses L2 to L4. L2 demagnifies the beam combined to L3 for the split beam 1 (SB1) and combined to L4 for the split beam 2 (SB2). The location of the lenses on each part of the beam splitter (BS) is equivalent to two unique lenses before the beam splitter, but allows for a more compact system.

Unit 2 includes the filtering element that is illustrated in FIG. 4 and is a compact polychromatic 1D filtering element with dispersion compensation. The filtering element comprises a first thin holographic grating to disperse the polychromatic incident sample beam. A second thick holographic grating, having dispersion approximately the same as the first thin hologram grating, is placed parallel to the first thin holographic grating (the grating surfaces are parallel, but not necessarily the grating vectors). After a first passage through the thick holographic grating where filtering in a first direction is carried out, a second thin grating, approximately or substantially identical to the first thin grating, collects the polychromatic beam to generate a (perfectly) collimated polychromatic beam. The beam is reflected by the prism mirror set at 45°, but not centered on the beam, to invert the x and y axis of the beam and shift the beam laterally when returned and is filtered in a second direction when passing back through the same triple holographic grating (filtering element).

After the double pass, the reference beam r is polychromatic, whose spectral bandwidth is determined by the bandwidth of the thin gratings (tens to hundreds of nanometers). Its coherence plane remains perpendicular to the propagation direction of the beam. The lateral shift induced by the prism mirror allows the reference beam r to pass outside the lens L3 and the beam splitter (BS).

In addition to the monochromatic setup illustrated in FIG. 10, the reference beam of the polychromatic setup in the embodiment of FIG. 11 also comprises a dispersion compensator that precisely matches the dispersion between the object beam and the reference beam. Dispersion differences between reference and object path arise from different optical elements that compose the reference and object. Even if the dispersion of the filtering element is already compensated by the glass windows, dispersion differences remain due to other differences in the optical elements, such as a prism mirror in the reference arm and a dove prism in the object arm.

The reference bream r then passes through a thin grating that deviates the beam and tilts (or orientates) the coherence plane of the reference beam r to (substantially) match the object beam's coherence plane when interference occurs on the camera.

In the present embodiment, the recombination of the reference beam r' and object beam o' is performed using a beam splitter BS.

In the present embodiment, the hologram formation unit (unit 4) comprises an image relay system composed of lenses L5 to L7. Lenses L6 and L7 focus the image of the sample near or on the recording plane of the camera. Lenses L5 and L7 ensure the reference beam to be oriented the same way as the object beam for optimal spatial coherence.

Advantageously, the lenses L5 to L7 could be used as magnifying or demagnifying lens system to match the beam diameter to the size of the recording plane of the camera.

FIG. 12 depicts an alternative filtering element according to the present invention. The sample beam S passes through a first multiplexed grating. Each of the gratings is calculated to diffract a polychromatic bandwidth centered on one of the RGB (red, blue, green) wavelengths. For simplicity in the present illustration, the three grating vectors have been chosen to be coplanar. The grating vectors can also have arbitrary angles between them. The thick grating is composed of three multiplexed gratings each one calculated and oriented to diffract one of the 3 beams diffracted by the first thin grating. The last thin grating is also multiplexed and oriented so that each grating collects back one of the three beams diffracted by the thick grating and combines them into a single beam. The outgoing beam is thus advantageously filtered in 1D over a bandwidth three times larger than the non-multiplexed version. The multiplexed filtering element can be inserted in any polychromatic setup, as for example the one shown in FIG. 11 if also multiplexing the thin grating that manages the coherence tilt. This latter thin grating managing the coherence tilt will then be multiplexed and include three gratings having parallel grating vectors and bandwidths that match the ones of the filtering element.

Unit 3: Coherence Management Unit

The third unit is ensuring that the reference and object beams interfere to ensure a hologram formation. Two conditions have to be satisfied or partially satisfied to have interference over the complete field of view in short coherence:

1. equal optical path length in both arms of the interferometer for every wavelength,
2. spatial coherence.

To satisfy the first condition, a delay is introduced in the object atm (defined by the path the object beam follows) or reference arm (defined by the path the reference beam follows) using a delay line OPLDS, as shown for example in FIGS. 10 and 11. The delay line can be any system that enables to increase or reduce the path length of one of the object or reference beams to match the path length of the other. It can be performed using moving parts in the setup, insertion/removing parts in the setup. Preferably, the path length is adjusted by a right angle prism in the object arm mounted on a linear translation stage.

If a dispersive element (such as the thick holographic grating of unit 2 illustrated in FIG. 10) is located in one of the object or reference arms (defined by the path the reference beam follows), it will induce different optical path delays for each wavelength and thus a temporal coherence chirp. A delay line will not correct this chirp, as it is designed to have a constant delay for each wavelength. Some appropriate dispersive elements, such as, but not limited to are, glass windows, gratings . . . that can be introduced to compensate for this chirp (FIG. 4).

To satisfy the second condition (spatial coherence), corresponding regions of the sample beam must overlay or overlap in the interference plane. This condition may be naturally satisfied, depending on the setup design. In the embodiments of the present invention (FIGS. 10 and 11), where the reference beam is reflected in an appropriate way to invert the x and y axis, one of the beams (reference or object beam) must have its axes inverted. Any element enabling the x-y axes inversion of the beam may be used. This is performed, for example, on the object beam using a dove prism as shown in FIG. 10. In the system illustrated in FIG. 11, a dove prism also carries out this function.

Spatial coherence also requires coherence planes of the reference and object beams to be coplanar. This condition may be naturally satisfied depending on the setup design.

Matching the unmatched coherence planes to render the coherence coplanar is addressed using diffractive elements, such as holographic gratings.

In the preferred embodiment of the present invention (FIG. 10), using an off-axis configuration and thick holographic gratings to filter the reference beam, does not allow the reference and object planes to match (to be coplanar) on the recording plane of the camera. Diffractive elements are used to correct for it. In the case of the preferred embodiment of FIG. 10, a thin holographic grating in the reference beam is used to match the reference and object coherence planes. A thin holographic grating is used in unit 3 of the device illustrated in FIG. 11 to address and orientate the coherence plane of the reference beam to produce a corrected reference beam r' that is substantially coplanar with object beam o'.

The thin grating used for coherence plane management are produced by registering a grating into a plastic photopolymer. The recording is performed by illuminating the material with two interfering beams having defined incidence angles and recording the interference. The exact parameters are calculated according to the beam incidence angle, beam out going angle and desired coherence plane tilt rotation, using the same coupled-wave theory as for the thick grating. The exposed element is then bleached using white light to stabilize the grating.

Advantageously, the coherence plane tilt management can be combined with the gratings of the filtering element. For example, the second thin grating of the second filtering element shown in FIG. 15 could combine the function of compensating the dispersion of the thick grating and the function of tilting the coherence plane to match the reference and object coherences on the recording plane of the camera.

In the preferred embodiment of a multiplexed grating, such as shown in FIG. 12, inserted in a polychromatic setup, such as shown in FIG. 11, the thin grating, matching the coherence plane of the reference beam to the one of the object beam on the camera recording plane, needs also to be multiplexed in order to match the bandwidths to the one of the filtering element. In the example illustrated in FIG. 12, the filtering element multiplexes three filtering elements for three different bandwidths, each one centered on one of an RGB wavelength. The thin film of the coherence management unit requires operating at the same bandwidths. It requires thus to multiplex three gratings each one calculated independently for each bandwidth.

Unit 4: Hologram Formation Unit

The fourth unit 4 ensures the formation of a hologram and its transmission to the processing unit (unit 5). A hologram results from the interference between a reference and an object beam. The configuration can be in-line, in which the reference and the object beams are collinear when interfering, or off-axis, in which the reference beam is inclined, compared to the object beam.

In the preferred embodiment of the present invention (see for example FIGS. 10 and 11), the system and setup creates off-axis holograms. The optical design ensures the image formation of the sample near or in the recording plane of a camera. The recording is performed using a digital camera. As illustrated in FIG. 10, interference occurs between the corrected reference beam r' and the corrected object beam o'. The numerical recorded image is transferred or communicated to the processing unit (unit 5). Alternatively, the processing unit 5 can be included in the camera.

In the embodiment illustrated in FIG. 10, the thin holographic grating that is part of unit 3 is configured (in addition to orientating the coherence plane of the reference beam) to deviate the reference beam to combine the object beam and the reference beam near or in the recording plane of a camera. Similarly, such thin holographic grating can be used to deviate the object beam to combine the object beam and the reference beam.

Figure 13:
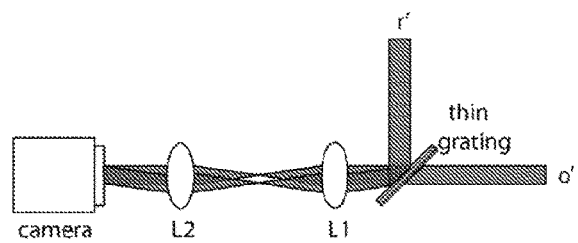
FIG. 13 illustrates a thin holographic grating configured to combine the object beam and the reference beam near or in the recording plane of a camera

As illustrated in FIG. 13, thin holographic grating can be configured to combine the object beam and the reference beam near or in the recording plane of a camera. FIG. 13 depicts the recombination of the reference beam r' and the object beam o' using a grating as recombination element. The reference beam reaches the grating under diffraction conditions and is diffracted towards the camera. The object beam o' is not reaching the grating under diffraction conditions and is thus passing through without being modified.

Preferably, lenses L1 and L2 image the grating onto the camera. This ensures that the angular dispersion induced by the grating is perfectly recombined onto the camera.

In the embodiment illustrated in FIG. 11, as previously mentioned, the recombination of the reference beam r' and object beam o' is performed using a beam splitter and lenses L5 to L7.

Unit 5: The Processing Unit

The processing unit comprises a computer or a processor C as well as software SW to operate the processor c. The processing unit extracts the optical amplitude and phase information originating from the sample out of the transmitted hologram. The unit 5 includes memory or storage to store the software and algorithm for processing the received the numerically recorded hologram to extract the optical amplitude and phase information.

Preferably, the process unit is a computer or processor with dedicated software.

The computation of the amplitude and phase can, for example, be performed as described in references 4, 5, 6, 7, or can be adapted.

The interference of the reference and object beams creates a hologram that is digitally recorded by the camera. The image of the object (sample or sample area) under investigation obtained by the optical system is not necessarily focused on the camera, but may be some centimeters in front or behind. The image is then transferred to the processor or computer.

Dedicated software processes the image to retrieve the complex optical wave front in amplitude and phase, as set out below.

The hologram is the recorded intensity (I) of a wave front resulting from the interference of both reference (R) and object (O) beams. The intensity is composed of four terms:

$$I=|O+R|^2=OO^*+RR^*+OR^*+RO^*,$$

where |.| denotes the absolute value and * the complex conjugate. The two first terms are the intensity of the object, respectively reference beams and compose the 0-order. The two last terms are the interference terms (order 1 and −1).

The process first filters the hologram to keep the spatial frequencies of interest. Those are the ones of one of the interference terms (preferably the term involving the object beam, OR*). This is performed in the spatial frequency domain obtained by a fast Fourier transform (FFT) of the hologram. The off axis geometry implies the spatial separation of the different interference orders (0, −1 and 1) in this domain. The filtering is performed by applying a mask. The inverse FFT generates the complex optical wave front of OR* in the plane of the camera.

As the object image may not be focused, the second part of the process consists in a numerical propagation of the wave front into focus. This is performed in the Fresnel approximation.

Finally, the last step is to extract the amplitude and phase measurements out of the propagated wave front by calculating the absolute value and argument.

The present invention also concerns a method for generating a hologram. A sample beam s is formed by collecting electromagnetic radiation coming from an object S.

Splitting of the sample beam and spatial filtering of the sample beam is carried out using a holographic filter element to produce an object beam o and a reference beam r comprising the spatially filtered split sample beam. Alternatively, the sample beam is split into a first split beam SB1 and a second split beam SB2 and spatially filtering of the first or second split beam is carried out using a holographic filter element to produce an object beam o comprising the non-filtered split sample beam and a reference beam r comprising the spatially filtered split sample beam.

A coherence plane of at least one of the object beam o and the reference beam r is orientated or tilted to render the coherence plane of the object beam o and the reference beam r substantially parallel.

The object beam and the reference beam are combined to create a hologram by interference between the reference beam and the object beam.

Preferably, the object beam and the reference beam are combined to create an off-axis hologram and a single camera acquisition shot acquires or captures the hologram.

Having described now the preferred embodiments of this invention, it will be apparent to one of skill in the art that other embodiments incorporating its concept may be used. This invention should not be limited to the disclosed embodiments, but rather should be limited only by the scope of the appended claims.

It should be noted that a component or components of one unit can alternatively be included in a different unit or shared by a plurality of units (for example, two units).

REFERENCES

1. J. E. Ludman, J. R. Riccobono, N. O. Reinhard, I. V. Semenova, Y. L. Korzinin, S. M. Shahriar, "Holographic nonspatial filter", SPIE, Vol. 2532, 1995
2. B. Bhaduri, H. Pham, M. Mir, G. Popescu, "Diffraction phase microscopy with white light", Opt. Lett., Vol. 37, No. 6, 1094-6, 2012
3. P. Girshovitz and N. T. Shaked, "Compact and portable low-coherence interferometer with off-axis geometry for quantitative phase microscopy and nanoscopy", Opt. Exp., Vol. 21, No. 16, 5701-5714, 2013.
4. EP1119798: METHOD AND APPARATUS FOR SIMULTANEOUS AMPLITUDE AND QUANTITATIVE PHASE CONTRAST IMAGING BY NUMERICAL RECONSTRUCTION OF DIGITAL HOLOGRAMS
5. U.S. Pat. No. 7,649,160 APPARATUS AND METHOD FOR DIGITAL HOLOGRAPHIC IMAGING
6. E. Cuche, P. Marquet, and C. Depeursinge, "Simultaneous amplitude-contrast and quantitative phase-contrast microscopy by numerical reconstruction of Fresnel off-axis holograms", Appl. Opt. 38 (34), 6994-7001 (1999).
7. E. Cuche, F. Bevilacqua, and C. Depeursinge, "Digital holography for quantitative phase-contrast imaging", Opt. Lett. 24 (5), 291-293 (1999).

The invention claimed is:

1. A hologram generating device for generating a hologram from a sample beam formed by collecting electromagnetic radiation coming from an object, the device comprising:
   a beam generation unit arranged to split the sample beam into an object beam and a reference beam, the object beam including a non-filtered or partially filtered first portion of the sample beam and the reference beam including a partially or completely filtered second portion of the sample beam;
   a coherence management unit arranged to orientate a coherence plane of at least one of the object beam and the reference beam to render the coherence plane of the object beam and the reference beam substantially parallel; and
   a hologram creation unit configured to combine the object beam and the reference beam to create the hologram by interference between the reference beam and the object beam,
   wherein the beam generation unit includes,
      a thick holographic grating configured to filter, inside the thick holographic grating, spatial frequencies in the sample beam to generate the non-filtered or the partially filtered object beam and the partially or completely filtered reference beam, or
      a thick holographic grating configured to receive a portion of the sample beam split from the sample beam inside the thick holographic grating to filter, inside the thick holographic grating, spatial frequencies of the split portion of the sample beam to generate the partially or completely filtered reference beam.

2. The device according to claim 1, wherein the thick holographic grating is configured to split the sample beam and to spatially filter the sample beam to produce the filtered object beam and the filtered reference beam; or the device further includes a splitter to split the sample beam into a first split beam and a second split beam, and the thick holographic grating configured to spatially filter the first or second split beam to produce the reference beam.

3. The device according to claim 2, wherein the thick holographic grating is configured to operate on a propagation angle of the electromagnetic radiation making-up the sample beam or the first or second split sample beam to select electromagnetic radiation propagating at a predetermined angle to spatially filter the sample beam or the first or second split sample beam to produce the filtered object beam or the filtered reference beam.

4. The device according to claim 1, wherein the hologram is an off-axis hologram.

5. The device according to claim 1, further comprising:
   an image forming device for forming the sample beam from electromagnetic radiation coming from the object.

6. The device according to claim 5, wherein the image forming device is an optical microscope.

7. The device according to claim 1, further comprising:
   a camera to capture and digitally record the hologram.

8. The device according to claim 1, further comprising:
   a processor configured to process the digitally recorded hologram and to extract at least one of an intensity information and a phase information from the hologram.

9. The device according to claim 1, wherein the thick holographic grating is arranged to be traversed successively two times by the split portion of the sample beam or once by the sample beam and once by the split portion of the sample beam to obtain the reference beam,
   wherein the second traversal of the thick holographic grating follows a beam rotation of the split sample beam or a reflection of the split portion of the sample beam to achieve a two-dimensional filtering of spatial frequencies in the split portion of the sample beam.

10. The device according to claim 1, further comprising:
    a splitter arranged to separate the sample beam incident on the splitter into two parts, before the filtering of the split sample beam by use of the thick holographic grating to generate the reference beam.

11. The device according to claim 1, wherein the thick holographic filtering element grating is configured to simultaneously split the sample beam and spatially filter the sample beam.

12. The device according to claim 1, wherein the coherence management unit comprises:
    a thin holographic grating that is arranged to orientate the coherence plane of at least one of the object beam and the reference beam.

13. The device according to claim 1, wherein the coherence management unit furthermore comprises:
    a device configured to modify an optical path length of at least one of the object beam and the reference beam in order to assure temporal coherence between the beams to produce the interference and the creation of the hologram.

14. The device according to claim 13, wherein the optical path length is modified by displacement of at least one of a mirror, a plurality of mirrors, a right angle prism, and several right angle prisms.

15. The device according to claim 1, wherein the coherence management unit further comprises:
    a device configured to rotate or reflect at least one of the object beam and the reference beam in order to assure spatial coherence between the beams to produce the interference and the creation of the hologram.

16. The device according to claim 1, further including a thin holographic grating configured to deviate the object beam or the reference beam to combine the object beam and the reference beam.

17. The device according to claim 1, wherein the hologram creation unit includes a splitter to combine the object beam and the reference beam.

18. The device according to claim 1, wherein the coherence management unit and the hologram generation unit share a thin holographic grating in common, the thin holographic grating being configured to deviate the object beam or the reference beam to combine the object beam and the reference beam, and to orientate the coherence plane of at least one of the reference beam and the object beam.

19. The device according to claim 6, wherein the optical microscope comprises:
    a light emitting diode (LED) as a light source, or a light emitting diode (LED) as a light source with a filtered emission spectrum in order to manage the temporal coherence.

20. The device according to claim 1, further comprising:
    a computer configured to reconstruct numerically the hologram for extracting intensity and phase images according to reconstruction methods of digital holography.

21. The device according to claim 1, further comprising:
    a microscope.

22. A method for generating a hologram comprising the steps of:

provㅁiding a sample beam formed by collecting electromagnetic radiation coming from an object;

splitting the sample beam and spatially filtering the sample beam by passing the sample beam through a thick holographic grating, and filtering, inside the thick holographic grating, spatial frequencies in the sample beam to produce a non-filtered or partially filtered object beam and a partially or completely filtered reference beam, or splitting the sample beam into a first split beam and a second split beam, spatially filtering the first or second split beam by passing the first or second split beam inside a thick holographic grating, and filtering, inside the thick holographic grating, spatial frequencies in the first or second split beam to produce a reference beam including a spatially filtered split sample beam and an object beam including a non-filtered split sample beam;

orientating a coherence plane of at least one of the object beam and the reference beam to render the coherence plane of the object beam and the reference beam substantially parallel; and combining the object beam and the reference beam to create the hologram by interference between the reference beam and the object beam.

23. The method according to claim 22, further comprising the step of:

combining the object beam and the reference beam to create an off-axis hologram.

24. The method according to claim 22, further comprising the step of:

carrying out a single camera acquisition shot to acquire the hologram.

* * * * *